US009612724B2

(12) United States Patent
Laborczfalvi et al.

(10) Patent No.: US 9,612,724 B2
(45) Date of Patent: Apr. 4, 2017

(54) INTEGRATING NATIVE USER INTERFACE COMPONENTS ON A MOBILE DEVICE

(71) Applicant: Citrix Systems, Inc., Fort Lauderdale, FL (US)

(72) Inventors: Lee Laborczfalvi, Wollstonecraft (AU); Richard Croft, Willoughby (AU); Anil Roychoudhry, Woodcroft (AU); Stephen Parry-Barwick, North Ryde (AU); Gus Pinto, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 137 days.

(21) Appl. No.: 13/688,497

(22) Filed: Nov. 29, 2012

(65) Prior Publication Data

US 2013/0139103 A1 May 30, 2013

Related U.S. Application Data

(60) Provisional application No. 61/564,517, filed on Nov. 29, 2011.

(51) Int. Cl.
*G06F 3/0485* (2013.01)
*G06F 3/0484* (2013.01)
(Continued)

(52) U.S. Cl.
CPC .......... *G06F 3/0484* (2013.01); *G06F 3/0481* (2013.01); *G06F 3/0485* (2013.01);
(Continued)

(58) Field of Classification Search
USPC ....... 715/740, 749, 746, 750, 751, 753, 766, 715/781, 794, 800, 803, 804, 843, 864;
(Continued)

(56) References Cited

U.S. PATENT DOCUMENTS 6,285,363 B1 * 9/2001 Mairs et al. .................. 715/751
7,577,910 B1 * 8/2009 Husemann et al. .......... 715/744
(Continued)

FOREIGN PATENT DOCUMENTS

CN 101263443 A 9/2008
CN 101482788 A 7/2009

OTHER PUBLICATIONS

Sep. 24, 2014—(CN) Notice of First Office Action—App 201180048406.1—English Translation.
(Continued)

*Primary Examiner* — Linh K Pham
*Assistant Examiner* — Wendy Nicholas
(74) *Attorney, Agent, or Firm* — BainwoodHuang (57) ABSTRACT

By enabling mobile devices, such as smart phones and tablets, to leverage native user interface components, the methods and systems described herein provide users a more seamless experience, wherein the user can potentially be oblivious to the fact that the application is not executing locally on the mobile device. In some embodiments, a user interface is provided which the user uses to trigger the display of a native user interface component. In some embodiments, the systems and methods described herein auto-adjust the pan and zoom settings on the mobile device to ensure that remote windows are presented in a manner that makes it easier for the user to interact with the device. The systems and methods described herein permit the user to switch to the new window in focus or a visual cue may be displayed to indicate that a window has been created somewhere on the remote desktop.

13 Claims, 6 Drawing Sheets

(51) Int. Cl.
*G06F 17/30* (2006.01)
*G06F 3/0481* (2013.01)

(52) U.S. Cl.
CPC ........... *G06F 17/30899* (2013.01); *G06F 2203/04806* (2013.01)

(58) Field of Classification Search
USPC .................. 345/169; 709/201, 202, 203
See application file for complete search history.

(56) References Cited

U.S. PATENT DOCUMENTS

| | | | |
|---|---|---|---|
| 8,046,695 B2* | 10/2011 | Ye et al. | 715/740 |
| 8,732,593 B2 | 5/2014 | Van Wie et al. | |
| 2002/0069218 A1 | 6/2002 | Sull et al. | |
| 2002/0129096 A1 | 9/2002 | Mansour et al. | |
| 2004/0003112 A1* | 1/2004 | Alles | G06F 9/5011 709/237 |
| 2005/0005241 A1 | 1/2005 | Hunleth et al. | |
| 2006/0033724 A1 | 2/2006 | Chaudhri et al. | |
| 2006/0288015 A1 | 12/2006 | Schirripa et al. | |
| 2007/0024646 A1 | 2/2007 | Saarinen et al. | |
| 2007/0198656 A1* | 8/2007 | Mazzaferri et al. | 709/218 |
| 2009/0172557 A1 | 7/2009 | Muta | |
| 2009/0183200 A1 | 7/2009 | Gritton et al. | |
| 2009/0241135 A1* | 9/2009 | Wong | G06F 9/4443 719/328 |
| 2010/0023878 A1 | 1/2010 | Douris et al. | |
| 2010/0138780 A1 | 6/2010 | Marano et al. | |
| 2010/0153866 A1 | 6/2010 | Sharoni | |
| 2010/0257450 A1 | 10/2010 | Go et al. | |
| 2010/0269046 A1 | 10/2010 | Pahlavan et al. | |
| 2010/0269152 A1* | 10/2010 | Pahlavan | G06F 9/4445 726/3 |
| 2010/0299436 A1 | 11/2010 | Khalid et al. | |
| 2010/0332984 A1* | 12/2010 | Tzruya | 715/716 |
| 2011/0138295 A1 | 6/2011 | Momchilov et al. | |
| 2011/0246891 A1* | 10/2011 | Schubert et al. | 715/719 |
| 2011/0246904 A1 | 10/2011 | Pinto et al. | |
| 2011/0319056 A1 | 12/2011 | Toy et al. | |
| 2012/0084663 A1 | 4/2012 | Momchilov et al. | |
| 2012/0096364 A1 | 4/2012 | Wilkinson et al. | |
| 2012/0137211 A1* | 5/2012 | Lewontin | G06F 17/30914 715/236 |
| 2012/0151369 A1 | 6/2012 | Kominac et al. | |
| 2012/0266079 A1* | 10/2012 | Lee | G06F 17/30283 715/744 |
| 2012/0324358 A1* | 12/2012 | Jooste | 715/733 |
| 2013/0111391 A1* | 5/2013 | Penner | G06F 3/04886 715/773 |
| 2014/0026063 A1 | 1/2014 | Duffy | |

OTHER PUBLICATIONS

"Nebulas Solutions Launches "VDI in a Box" to Cut the Cost, Time and Complexity of Deploying Virtual Desktop Infrastructures", Aug. 4, 2009.
International search report and written opinion for application No. PCT/US11/54922 mailed Mar. 2, 2012.

* cited by examiner

INTEGRATING NATIVE USER INTERFACE COMPONENTS ON A MOBILE DEVICE

CROSS REFERENCE TO RELATED APPLICATIONS

This application is a non-provisional of and claims priority to U.S. provisional application Ser. No. 61/564,517, filed Nov. 29, 2011, entitled "METHODS AND SYSTEMS FOR INTEGRATING NATIVE USER INTERFACE COMPONENTS ON A MOBILE DEVICE WITH A VIRTUALIZED APPLICATION," herein incorporated by reference in its entirety.

FIELD

The present disclosure relates generally to displaying applications, which are executing remotely on a server, on a mobile device. In particular, the present disclosure is directed to integrating native user interface components on a mobile device with a virtualized application.

BACKGROUND

With the pervasiveness of computers, network access, and Internet usage in daily personal and professional activities, many users desire mobility and flexibility. As a result of the mobility offered by various mobile devices, such as smart phones and tablets, users typically seek convenience and familiarity in their computing needs. Many applications include graphical user interfaces that were developed for personal computers and laptops with large displays and conventional input devices, such as a keyboard and mouse. Further, a user may be used to interacting with an application through desktop operating systems, such as the Windows operating system of MICROSOFT Corp. and the MACINTOSH Operating System (MAC OS) of APPLE Inc. However, mobile devices are often designed to be compact and have limited display and input capabilities. Further, the user interface(s) and/or operating system(s) installed on a mobile device are often designed with the compact nature, limited display and limited input capabilities of the mobile device in mind, and, thus, provide a user with a different experience than the desktop operating systems. Although several methods have been developed to present desktop applications on mobile devices, the results typically range from cumbersome and clumsy to not feasible or cost-prohibitive. Thus, there remains an ever present need to improve the presentation of desktop applications on mobile devices and to improve a user's experience when interacting with desktop applications that are being presented on mobile devices.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

By enabling mobile devices, such as smart phones and tablets, to leverage native user interface components, the methods and systems described herein provide users a more seamless experience, wherein the user can potentially be unaware of the fact that the application is not executing locally on the mobile device, but instead is executing remotely. For example, a server may be hosting the application and may be in communication with the mobile device to enable the mobile device to present the application, such as a window for the application in a graphical user interface of the mobile device. In some embodiments, the systems and methods described herein provide a user interface module to trigger the display of a native user interface component, such as a smartphone touch screen keyboard, in connection with the window for the application. As one example, whenever a text input field on the server gains or loses user focus, a remote computing device may send a message to the mobile device. The message can be interpreted by the mobile device to trigger or dismiss the native user interface component.

Additionally, in some embodiments, the systems and methods described herein auto-adjust the pan and zoom settings on the mobile device to ensure that windows for the application are presented in a manner that makes it easier for the user to complete various interactions. For example, using windowing information, a user can zoom into different regions of a window for the application including a zoom out and a zoom in.

In some embodiments, the server may be hosting the application in a remote desktop and as windows pop-up or get created in the remote desktop, the windows might not be visible on the mobile device. The systems and methods described herein permit the user to switch to or bring in focus the new window. In some embodiments, a visual cue may be displayed to indicate that a window has been created somewhere on the remote desktop.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Some embodiments may be described in the context of a network providing services to user devices over various networks using one or more protocols. The disclosure is not limited to any particular type of network or networks using a specific type of communication medium or to a specific set of communication protocols.

Figure 1:
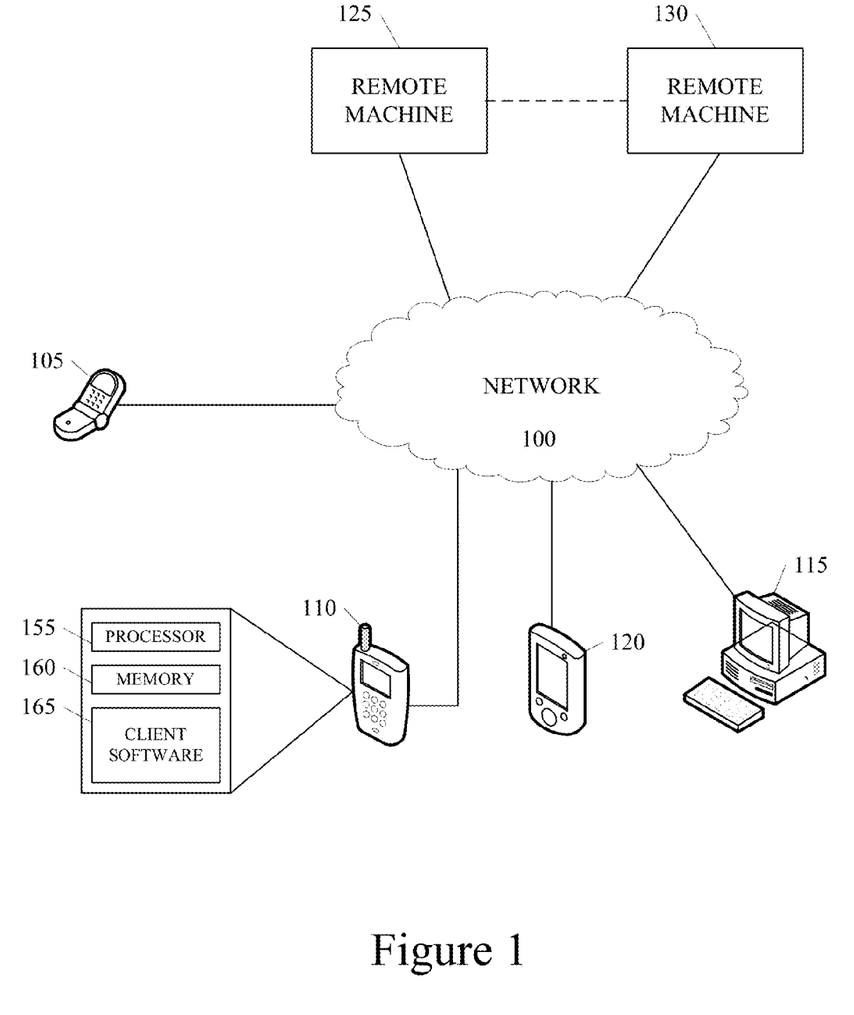
FIG. 1 is a block diagram showing an illustrative example of a network environment in which various aspects of this disclosure may be implemented.

FIG. 1 is a block diagram showing an illustrative example of a network environment in which various aspects of this disclosure may be implemented. In the embodiment illustrated in FIG. 1, the network environment may include a number of local computers and electronic devices (also generally referred to as local computing device(s), local machine(s), client computer(s), or the like), including mobile communication device 105, mobile phone 110, personal digital assistant (PDA) or mobile computer 120, personal computer (PC) 115 (e.g., laptop computer or desktop computer). While the examples and embodiments herein are described in connection with a mobile device (e.g., mobile communication device 105, mobile phone 110, personal digital assistant (PDA), tablet computer, smart phone, and the like), various aspects described herein could be used on other types of local computing devices. Other types of local computing devices include personal computer 115, a digital audio player, a portable media player, a desktop computer, a laptop computer, a thin client device, or some other device that combines of the above local computing devices (e.g., a device with functionality of a mobile phone and digital audio player).

As also illustrated in FIG. 1, the network environment may also include one or more remote computing devices (also generally referred to as server(s), remote server(s), or the like), such as remote machine 125 and remote machine 130. The various devices of the network environment may communicate with one another and with other devices through network 100. Network 100 may include wired and wireless connections and network elements, and connections over the network may include permanent or temporary connections. Communication through network 100 is not limited to the illustrated devices and may include additional mobile or fixed computing devices.

Although shown as a single network in FIG. 1 for simplicity, network 100 may include multiple networks that are interlinked so as to provide internetworked communications. Such networks may include one or more private or public packet-switched networks such as, for example, a local-area network (LAN) (e.g., a company intranet), a metropolitan area network (MAN), or a wide area network (WAN) (e.g., the Internet or World Wide Web). Such networks may also include one or more private or public circuit-switched networks (e.g., a public switched telephone network), a cellular network configured to facilitate communications to and from mobile communication device 105 and/or 110 (e.g., through use of base stations, mobile switching centers, etc.), a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network (e.g., Evolution-Data Optimized (EV-DO) networks, Universal Mobile Telecommunications System (UMTS) networks, Long Term Evolution (LTE) networks or Enhanced Data rates for GSM Evolution (EDGE) networks). Devices 105-120 may use various communication protocols such as Internet Protocol (IP), Transmission Control Protocol (TCP), Simple Mail Transfer Protocol (SMTP) among others known in the art.

Devices 105-120 may be configured to interact with each other or other devices, such as remote machine 125 and remote machine 130. In one example, mobile device 110 may include client software 165 that is configured to coordinate the transmission and reception of information to and from remote machine 130. In one arrangement, client software 165 may include application or server specific protocols for maintaining connections to and requesting/receiving data from remote machines 125 and/or 130. For example, client software 165 may comprise a Web browser or mobile variants thereof and content provider/server 130 may comprise a web server. Client software 165 may be stored in computer-readable memory 160 such as read only, random access memory, writeable and rewriteable media and removable media in device 110 and may include instructions that cause one or more components—for example, processor 155, a transceiver, and a display—of device 110 to perform various functions and methods including those described herein.

In some embodiments, the network environment 100 may include multiple, logically-grouped remote computing devices. In one of these embodiments, the logical group of remote machines may be referred to as a server farm. In another of embodiment, the remote computing devices may be geographically dispersed (e.g., physically located in different geographic regions, countries, states, etc.). In some variations, a server farm may be administered as a single entity.

Each of the remote computing devices may be a file server, application server, web server, proxy server, gateway, application gateway, gateway server, or the like. Additionally, remote computing devices may be one or more blade servers or virtual machines. In some embodiments, remote machines 125 and 130 may provide a remote authentication dial-in user service, such as RADIUS. In one or more variations, the remote computing devices may have the capacity to function as either an application server or as a master application server.

The remote computing devices, in some embodiments, can be any server type. In other embodiments, the remote computing devices can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. In embodiments where a remote computing device comprises an appliance, the appliance may be from any one of the following manufacturers, among others: the Citrix Application Networking Group; Silver Peak Systems, Inc; Riverbed Technology, Inc.; F5 Networks, Inc.; or Juniper Networks, Inc.

In some embodiments, remote machine 125 and remote machine 130 may provide local computing devices (e.g., device 105, 110, 120 and 115) access to a computing environment. A computing environment may comprise an application, a plurality of applications, a desktop, desktop environment, and/or a desktop session in which one or more applications may execute. In some instances, remote machine 125 or 130 may execute an application on behalf of a user of a local computing device. Remote machine 125 or 130 may execute a virtual machine, which provides an execution session within which applications execute on behalf of a user of a local computing device. On some arrangements, the virtual machine may be managed by a hypervisor, such as the XEN hypervisor, developed and sold by CITRIX SYSTEMS, Inc.; HYPER-V, developed and sold by MICROSOFT Corp.; ESX hypervisor developed and sold by EMC, or any other hypervisor. Communication between the remote computing devices and local computing devices may be performed so that local computing devices may request execution of various applications hosted by the remote computing devices and/or that local computing devices may receive data related to the application for presentation (e.g., display) on the local computing devices.

As used herein, a desktop, desktop environment, or desktop session refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In some embodiments, each of the remote computing devices may be running one or more applications, such as an application providing a thin-client computing or remote display presentation application. In one embodiment, the remote computing devices may be executing as an application any portion of the CITRIX ACCESS SUITE by CITRIX SYSTEMS, Inc., such as the METAFRAME or CITRIX PRESENTATION SERVER products; any of the MICROSOFT WINDOWS TERMINAL SERVICES manufactured by the MICROSOFT Corporation; and/or any of the following products manufactured by CITRIX SYSTEMS, Inc.: CITRIX XENAPP, CITRIX XENDESKTOP, CITRIX ACCESS GATEWAY. Various other suitable applications can also be executed, including an Independent Computing Architecture (ICA) client, developed by CITRIX SYSTEMS, Inc.; an application providing email services such as MICROSOFT EXCHANGE manufactured by the MICROSOFT Corporation; a web or Internet server application; a desktop sharing server application; and a collaboration server application. Additionally or alternatively, the remote computing devices may provide various types of hosted services or products, such as GOTOMEETING provided by CITRIX ONLINE; WEBEX provided by WEBEX, Inc.; and MICROSOFT OFFICE LIVE MEETING provided by MICROSOFT CORPORATION.

Each of the local computing devices may execute, operate or otherwise provide one or more applications to facilitate remote computing. Such applications can be of various type and/or form such as a web browser, web-based client, client-server application, a thin-client computing client, ActiveX control, Java applet, or the like. Using such applications, a local computing device may be able to provide remotely hosted applications on the local computing devices. In some arrangements, the remotely hosted applications may be a server-based or a remote-based application executed on behalf of the local computing device on a remote computing device (e.g., remote machine 125). In one or more embodiments, a remote computing device may communicate data for display to the local computing device using any thin-client protocol, presentation layer protocol, or remote-display protocol, such as the ICA protocol; the Remote Desktop Protocol (RDP); the X11 protocol; the Virtual Network Computing (VNC) protocol; the SPICE protocol; the Net2Display protocol; the PC-over-IP protocol; the TCX protocol; the THINC protocol; and the Virtual-D protocols. Applications provided by the local computing device may use any type of protocol and one or more of the applications provided by the local computing device can be, for example, an HTTP client, an FTP client, an Oscar client, a Telnet client, software related to voice over Internet protocol (VoIP) communications; and applications related to real-time data communications (e.g., software for streaming video and/or audio).

In some embodiments, the remote computing devices and local computing devices may be configured to communicate with each other via any type or form of gateway or tunneling protocol, such as Secure Socket Layer (SSL), Transport Layer Security (TLS), and Citrix Gateway Protocol of Citrix Systems.

Some embodiments include a first remote computing device that receives requests from a local computing device, forwards the request to a second remote computing device, and responds to the request generated by the local computing device with a response from the second remote computing device. The first computing device can acquire an enumeration of applications available to the local computing device and well as address information associated with the remote computing device that is hosting an application identified within the enumeration of applications. The first remote computing device can then present a response to the client's request using, for example, a web interface. In some arrangements, the first remote computing device may communicate directly with the local computing device to provide the local computing device with access to an identified application.

Figure 2A:
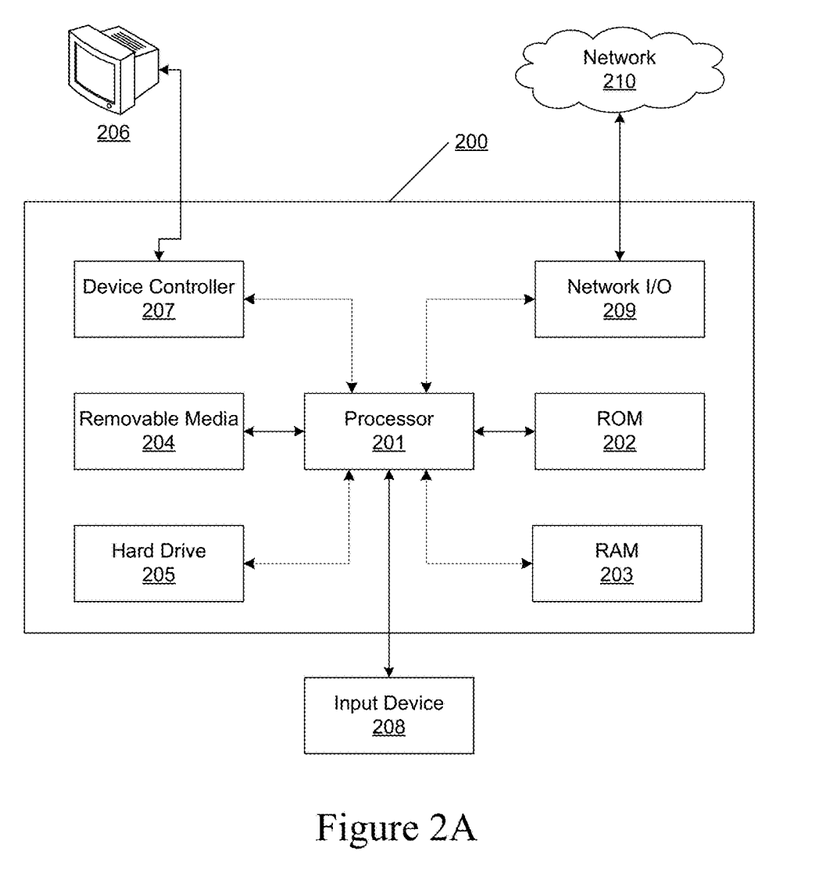
FIG. 2A shows an illustrative hardware platform on which various elements described herein can be implemented.

FIG. 2A shows an illustrative hardware platform on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions, one or more operating systems, and/or one or more applications may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of a network illustrated in FIG. 1, or any other desired network.

The FIG. 2A example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

Figure 2B:
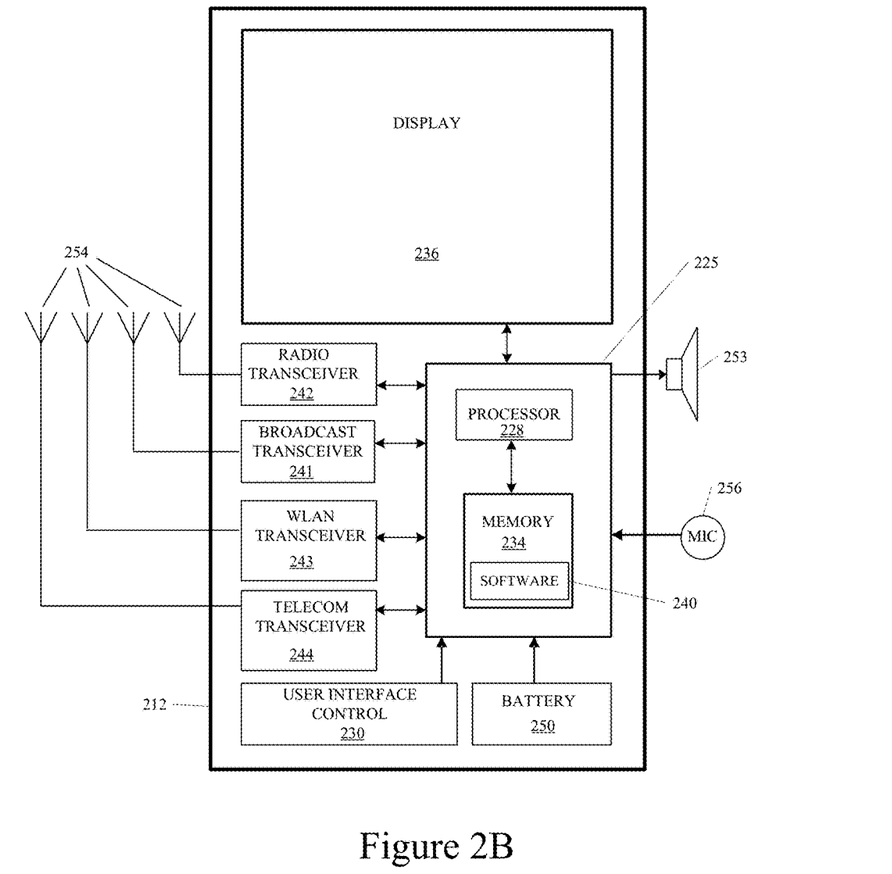
FIG. 2B shows an illustrative mobile computing device that may be used in a network environment according to various aspects described herein.

FIG. 2B shows an illustrative mobile computing device that may be used in a network environment, such as the network environment of FIG. 1. Mobile device 212 may include a controller 225 connected to a user interface control 230, display 236 and other elements as illustrated. Controller 225 may include one or more processors 228 and memory 234 storing software 240, such as an operating system and/or one or more applications. Mobile device 212 may also include a battery 250, speaker 253 and antenna 254. The mobile device 212 may include user interface circuitry, such as user interface control 230. User interface control 230 may include controllers or adapters, and other circuitry, configured to receive input from or provide output to a keypad, touch screen, voice interface. Input can be received, for example, via microphone 256, function keys, joystick, mouse and the like. The user interface circuitry, user interface software and operating system may be configured to facilitate user control of at least some functions of the mobile phone though use of a display. Display 236 may be configured to display at least a portion of a user interface of the mobile device. Additionally, the display may be configured to facilitate user control of at least some functions of the mobile device.

Mobile device 212 or its various components may be configured to receive, decode and process various types of transmissions including digital broadband broadcast transmissions that are based, for example, on the Digital Video Broadcast (DVB) standard, such as DVB-NGH, DVB-H, DVB-T2, DVB-H+ (hybrid satellite/terrestrial architecture), or Digital Video Broadcasting—Multimedia Home Platform (DVB-MHP), through a specific broadcast transceiver 241. Other digital transmission formats may alternatively be used to deliver content and information regarding availability of supplemental services. Additionally or alternatively, mobile device 212 may be configured to receive, decode and process transmissions through various transceivers, such as FM/AM Radio transceiver 242, wireless local area network (WLAN) transceiver 243, and telecommunications transceiver 244.

Although the above description of FIG. 2B generally relates to a mobile device (e.g., mobile devices 105, 110 of FIG. 1), other devices or systems may include the same or similar components and perform the same or similar functions and methods. For example, a stationary computer (e.g., personal computer 115 of FIG. 1A) may include the components or a subset of the components described above and may be configured to perform the same or similar functions as mobile device 212 and its components.

Computing devices, such as the examples depicted in FIGS. 2A and 2B, typically operate under the control of one or more operating systems. Operating systems may control scheduling of tasks and access to system resources. Various operating systems are suitable to operate a computing device, such as any of the versions of the Microsoft Windows operating systems, the different releases of the UNIX and LINUX operating systems, and any version of the MAC OS for MACINTOSH computers. Other types of operating systems include embedded operating systems, real-time operating systems, open source operating systems, proprietary operating systems, operating systems for mobile computing devices, and the like. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by MICROSOFT Corporation; MAC OS, manufactured by APPLE Inc.; OS/2, manufactured by INTERNATIONAL BUSINESS MACHINES; and LINUX, a freely-available operating system distributed by CALDERA Corp. Other operating systems include the ANDROID operating system developed by GOOGLE Inc., IOS from APPLE, Inc., WEBOS from PALM, Inc., WINDOWS PHONE OS from MICROSOFT Corporation, and other operating systems for use with a mobile device.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects, and such data structures are contemplated within the scope of computer executable instructions and computer-usable data described herein.

Figure 3:
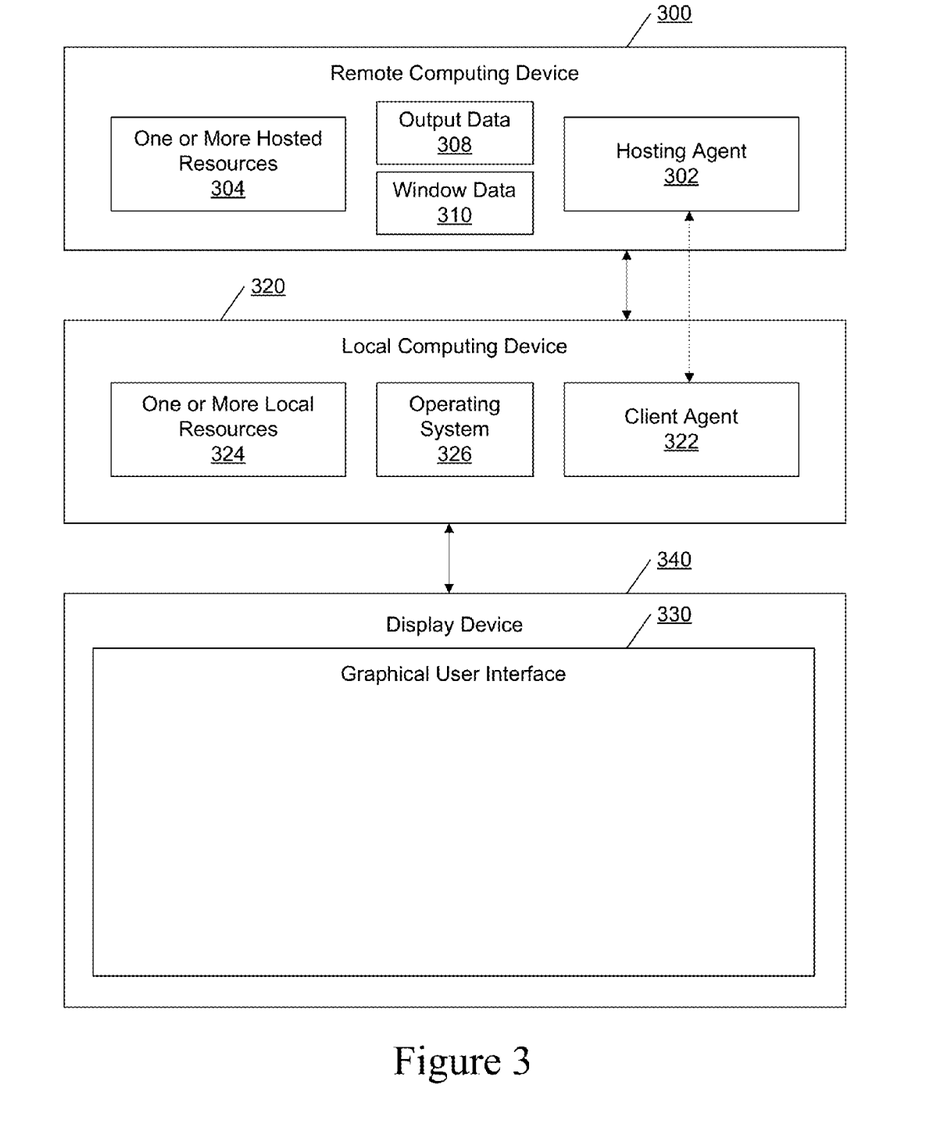
FIG. 3 is a block diagram showing an example arrangement for providing resources from a remote computing device to a local computing device according to various aspects described herein.

One or more aspects of this disclosure relate to providing resources from a remote computing device to a local computing device. A resource may be a program, application, document, file, graphical window, or the like. In some variations the resource (also referred herein as a remote resource or hosted resource) may be operating in a desktop environment of the remote computing device. In one or more embodiments, a user may initiate a connection between a local computing device and a remote computing device. While connected, the user may interact with the remote computing device to request various actions for processing by the remote computing device, including, for example, execution of a resource, zooming in of a window, zooming out of a window, placing a window in focus, placing a window out of focus, termination of a resource, editing of a resource, and saving of a resource. FIG. 3 is a block diagram showing an example arrangement for providing resources from a remote computing device to a local computing device. As illustrated in FIG. 3, remote computing device 300 may be in communication with a local computing device 320. In some embodiments, local computing device 320 may be a mobile device, such as, for example, one similar to the device shown in FIG. 2B, or a tablet computing device. Local computing device 320 may provide a display of a graphical user interface, on display device 340, for viewing by a user. Additionally, local computing device 320 may be executing or otherwise providing one or more local resources 324.

In some embodiments, remote computing device 300 may be executing a hosting agent 302. The hosting agent 302 may be configured to receive data from the local computing device 320, including requests for resources, interactions with the resources, among other various data communications. In some variations, the hosting agent 302 may be configured to send data to the local computing device 320, including data related to one or more hosted resources 304 being executed by the remote computing device 300. In some arrangements, hosting agent may be part of or in communication with a presentation layer protocol agent (now shown). The hosting agent 302 may include software, hardware or any combination thereof. Additionally, the hosting agent 302 may be configured to communicate with applications executing on the remote computing device 300 (e.g., hosted resources 304, which in some embodiments can be referred to as virtualized resources, virtualized applications, remote resources, or remote applications) and/or access data related to such applications (e.g., output data 308, window data 310). Further, the hosting agent 302 may use a presentation layer protocol (layer 6 of the OSI model) for at least some communications.

While the one or more hosted resources 304 are executing, each may generate output data 308 and window data 310. Output data 308 and window data 310 may include the data used to prepare, render or include in a graphical window for a hosted resource, including, for example, window attributes defining properties of the graphical window (e.g., window size, position, lifetime, Z-order), image data of the graphical window, data objects defining graphical elements that are displayed in the graphical window, data defining the window's relationship to another resource (e.g., an indication whether the window is a child of another window or application), object location data identifying locations for the graphical elements, data defining title bar contents for the graphical window, data describing the visual state of the graphical window (e.g., transparency), an icon (or bitmap of an icon) for the graphical window, window location data identifying the location for the graphical window in a desktop environment, various identifiers for the resource, and a path to the resource or the process that generated the resource. In some embodiments, the one or more hosted resources 304 may be executing within a desktop environment of the remote computing device 300. Additionally, in some variations, output and window data 308 may also include one or more commands, such as commands to create a window, delete a window, move a window, bring focus to a window, make a window transparent or partially transparent, open a menu of the window, close a menu of the window, resize a window, select a button or other element included in the window, etc.

Portions of output data 308 and window data 310 may be communicated to the local computing device 102 to enable the local computing device 320 to render a local version of a graphical window for the one or more hosted resources in local desktop environment 330, or otherwise graphically integrate the hosted resource into the local desktop environment 330. In some arrangements, hosting agent 302 may be configured to directly communicate output data 308 and window data 310 to the client agent 322 (e.g., via a port, channel or tunnel). Alternatively, hosting agent 302 may be configured to cause or initiate communication of the output data 308 and window data 310 to the local computing device 320.

Client management engine 322 may receive data from the remote computing device 300, including output data 308 and window data 310. In some arrangements, the data may be received via dedicated ports, channels or tunnels. For example, client agent 322 may receive output data 308 in one port, channel or tunnel, and may receive window data 310 for the hosted application in another port, channel or tunnel. In some arrangements, client agent 322 may receive the data using a dynamically linked library component that receives output data 308 and/or window data 310. In turn, the received data may be used in presenting a local version of the window on the graphical user interface 330.

More fully, client agent 322 may be configured to interface with operating system 326 of the local computing device to render a local version of the hosted resource. For example, client agent 322 may interact with a shell of the operating system. The client agent 322 may be configured to communicate with the operating system 326 to modify the configuration and/or display of the operating system's graphical user interface (e.g., desktop environment). For example, client agent 322 may be configured to store output data and window data received from remote computing device 300 and may call one or more functions from a shared library, such as a dynamically-linked library (DLL) to maintain or modify graphical user interface 330 (e.g., modify a taskbar, modify a placement of a window, close a window, create a window, modify contents of a window). Through the interactions with the operating system, the client agent 322 may provide a local version of a hosted resource, which is executed by remote computing device 300, to a user of the local computing device. The client agent 322 may be configured to modify various elements of the graphical user interface 330 The methods used to modify the elements of the graphical user interface 330 may depend on the operating system 326 operating on the local computing device 320. For example, a method for used when operating system 326 is a version of Android may be different than a method used when operating system 326 is a version of iOS.

Figure 4:
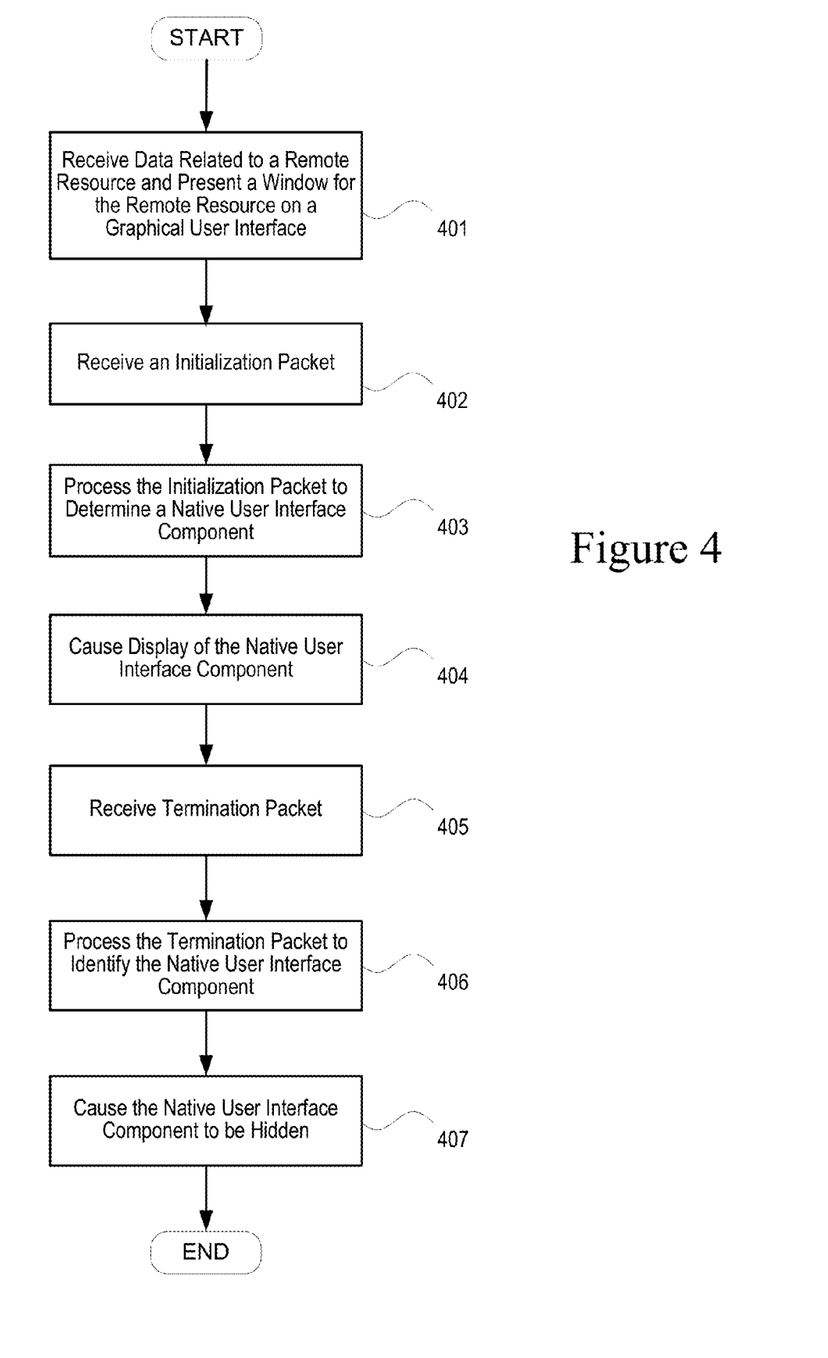
FIG. 4 illustrates an example method for causing one or more native user interface components to be integrated on a graphical user interface of a local computing device, according to one or more aspects described herein.

FIG. 4 illustrates an example method for integrating one or more native user interface components on a graphical user interface of a local computing device, such as a mobile device or tablet device. In particular, the FIG. 4 example is a method suitable for use at a mobile device to receive information from a remote computing device that causes the integration of the native user interface components with the mobile device's graphical user interface (e.g., graphical user interface 330 of FIG. 3) or to remove the native user interface components from the graphical user interface.

At step 401, the mobile device (or client agent executing on the mobile device) may receive data related to a remote resource (e.g., output data and window data) from a remote computing device and present a window for the remote resource on a graphical user interface of the mobile device.

In some embodiments, the mobile device may interpret the data related to the remote resource and apply an automatic zoom or position the window for the remote resource to be visible to the user. In some embodiments, the user provides preferences for zoom percentage and events or data than trigger an automatic zoom. In some embodiments, the preferences are predetermined by a system administrator or at time of manufacture.

In some embodiments, secondary windows, new windows, or "child" windows may be presented as part of the remote resource. In some embodiments, as the secondary windows pop-up, the mobile device may apply a zoom to the secondary windows so that they are presented in a manner that makes interacting with the window easier. For example, if a "File Open" dialog box is launched by the remote resource, the mobile device may receive the information that a secondary window was created and can adjust the zoom and pan position to display the dialog to better fit on the display screen of the mobile device. In some embodiments, there is sufficient metadata in the presentation layer protocol to determine which windows should be automatically brought to focus and made visible to the user. In some embodiments, windows such as "Tooltips" can be discriminated against and won't be automatically panned or zoomed. Such automatic panning and zooming (and the discrimination against automatic panning or zooming) may be performed again upon display of the native user interface control, which is described below in connection with step 404, and, upon the native user interface component being removed from the display of the mobile device, which occurs at step 407.

In some embodiments, the data related to the remote resource that was received from the remote computing device can be used to display visual cues of window activity in the remote resource even if only a portion of the remote desktop hosted by the remote computing device is displayed on the mobile device. In some embodiments, the visual cues enable the user of the mobile device to keep track of the various windows created on the remote desktop even if they are not displayed on the screen of the mobile device.

In some embodiments, the user will be able to jump between windows within a session. Using the automatic zoom and automatic positioning functionality, the user can seamlessly tab between various windows.

At step 402, the mobile device (or client agent executing on the mobile device) may receive information associated with the window of the remote resource from the remote computing device such as, for example, an initialization packet. In some instances, the initialization packet may be accompanied by the data related to a remote resource (e.g., the data received at step 401). In others, the initialization packet may be received in a transmission different from one that includes the data related to the remote resource. Further, in some arrangements, the initialization packet may be received as part of output or window data. Additionally, as will be discussed further below, the initialization packet may be received responsive to a click event being transmitted from the mobile device to the remote computing device.

At step 403, the mobile device (or client agent executing on the mobile device) may process the initialization packet to determine a native user interface component required by a remote resource. In some arrangements, the initialization packet may include various data types that are used to determine the native user interface component. For example, coordinate information, size information and the like that is included in the initialization packet may be used to identify the native user interface component (e.g., window size, window position, window lifetime, and/or Z-order).

In some embodiments, the information included in the initialization packet may be compared against window data of the mobile device's graphical user interface, or window data for the remote resource that was received from the remote computing device. Based on the comparison, the mobile device may determine a particular native interface control to activate. For example, if the comparison identifies a text input control, the native user interface component may be a keyboard native to the mobile device. If the comparison identifies a menu control, the native user interface component may be a drop down menu native to the mobile device (although, in some instances, the native drop down menu may be populated with information text received from the remote computing device). If the comparison identifies a date picker control, the native user interface component may be a date picker. Various other types of native user interface control may be determined, including any control that could be determined based on information such as window size, window position, window lifetime, Z-order, and the like. In some arrangements, the initialization packet may include a command from the remote computing device that identifies a particular native interface control to activate.

At step 404, the mobile device (or the client agent executing on the mobile device) may cause display of the native user interface component of the responsive to the determination.

At step 405, the mobile device (or the client agent executing on the mobile device) may receive a termination packet from the remote computing device.

At step 406, the mobile device (or the client agent executing on the mobile device) may process the termination packet to identify the native user interface component. The information included within a termination packet that is used to determine which native user interface component to terminate may be similar to the information used at step 403. For example, the termination packet may include coordinate information, size information and the like (e.g., window size, window position, window lifetime, and/or Z-order). In some arrangements, instead of receiving a termination packet at step 406, another initialization packet may be received. In such arrangements, the mobile device may determine the native user interface component from the initialization packet, determine that the native user interface component is being displayed on the mobile device, and in response, may proceed to step 407.

At step 407, the mobile device (or the client agent executing on the mobile device) may cause the native user interface component to be hidden in the graphical user interface of the mobile device, or may otherwise remove the native user interface component from the graphical user interface.

Figure 5:
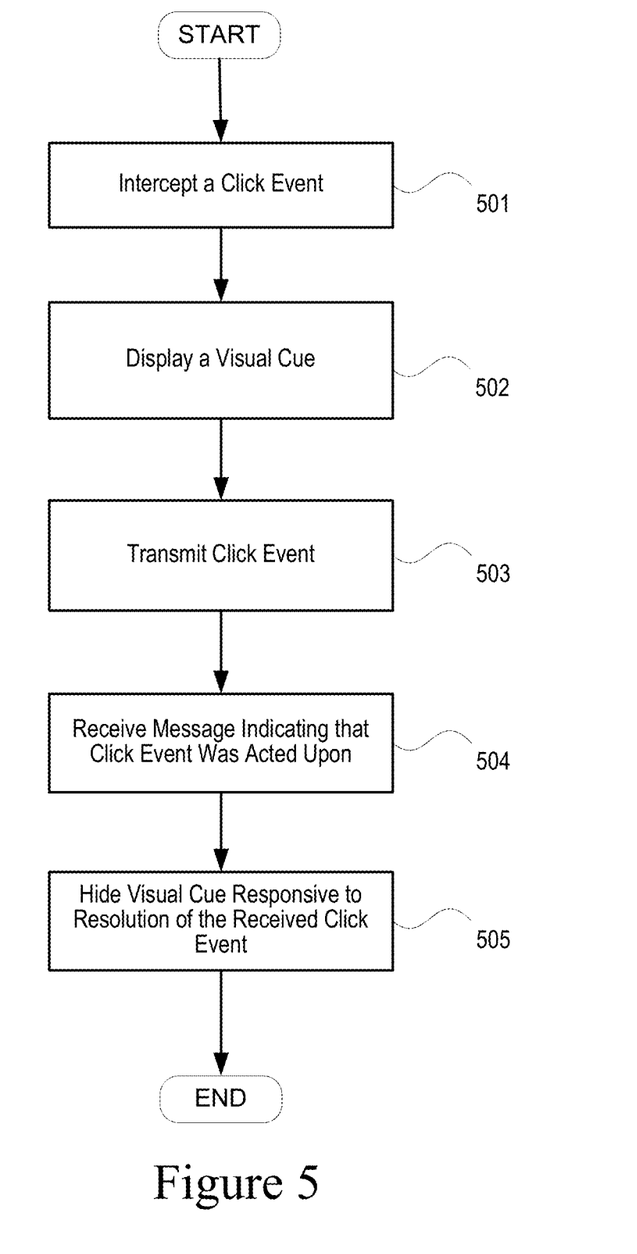
FIG. 5 illustrates an example method for causing one or more native user interface components to be integrated on a graphical user interface of a local computing device based on a click event received from a local computing device, according to one or more aspects described herein.

Native user interface components may be determined based on click events received at the mobile device. FIG. 5 illustrates an example method for causing one or more native user interface components to be integrated on a graphical user interface of a mobile device based on click events received at a mobile device.

At step 501, the mobile device (or client agent executing on the mobile device) may intercept a click event that was generated based on a user interaction with the graphical user interface of the mobile device.

At step 502, the mobile device (or client agent executing on the mobile device) may display a visual cue on a display of the mobile device responsive to the received click event. In some embodiments, the visual feedback persists until the click event is acted on by remote resource.

At optional step 503, the mobile device (or client agent executing on the mobile device) may transmit the click event to the remote computing device.

In some arrangements, transmitting the click event to the remote computing device may cause the remote computing device to transmit the information received at step 402 of FIG. 4 (e.g., the initialization packet). As one example, whenever a text input field on the server gains or loses user focus via a user interaction, a click event may be generated and transmitted to the remote computing device. In response, the remote computing device may send an initialization packet to the mobile device. The initialization packet can be interpreted by the mobile device to trigger (steps 402-404 of FIG. 4) a native user interface component (steps 406-407 of FIG. 4).

At optional step 504, the mobile device (or client agent executing on the mobile device) may receive a message or a packet from the remote computing device indicating that the click event initiated by the user on the mobile device was acted upon. In some embodiments, the packet received at step 504 may be a termination packet or an initialization packet, which can also cause the mobile device to remove the native user interface component to be not displayed on the mobile device (e.g., steps 406 and 407 of FIG. 4).

At step 505, the mobile device (or client agent executing on the mobile device) may hide the visual cue responsive to resolution of the received client event.

Identification of specific commercial hardware and/or software products are for illustrative purposes only, and are not meant to be limiting in any way. Other hardware and/or software with similar or equivalent functionality may also be used. Additionally, numerous other embodiments, modifications and variations within the scope and spirit of the appended claims will occur to persons of ordinary skill in the art from a review of this disclosure.

We claim:

1. A method, comprising:
   presenting, by a mobile device, at least a portion of a window for a remote resource on a graphical user interface of the mobile device, wherein the remote resource is hosted by a remote computing device;
   transmitting a click event from the mobile device to the remote computing device;
   receiving, by the mobile device from the remote computing device, information associated with the window for the remote resource, wherein the information received from the remote computing device comprises an initialization packet that is responsive to the click event, and wherein the initialization packet contains Z-order information that may be used to identify a date picker native to the mobile device;
   in response to receipt of the information from the remote computing device, comparing, by the mobile device, the Z-order information contained in the initialization packet to window data of a graphical user interface of the mobile device to determine that the date picker native to the mobile device should be activated, wherein the window data describes one or more properties of the window for the remote resource on the graphical user interface of the mobile device; and
   displaying, on the mobile device, the date picker native to the mobile device;
   receiving, from the remote computing device, a termination packet;
   processing the termination packet to identify the date picker native to the mobile device; and
   causing the date picker native to the mobile device to be not displayed on the mobile device.

2. The method of claim 1, wherein the information further comprises one or more of window size, window position, or window lifetime, wherein the window data comprises window data of a graphical user interface of the mobile device or window data for the remote resource that was received from the remote computing device; and
   wherein comparing the information to the window data comprises comparing the one or more of the window size, the window position, or the window lifetime, to the window data of the graphical user interface of the mobile device.

3. The method of claim 1, further comprising:
   automatically zooming or panning to the portion of the window; and
   displaying a secondary window for the remote resource on the mobile device without automatically zooming or panning to the secondary window.

4. The method of claim 1, wherein comparing the information to the window data to determine that the date picker native to the mobile device should be activated comprises:
   identifying a date picker control based on the comparing; and
   determining that the date picker native to the mobile device should be activated responsive to identifying the date picker control.

5. The method of claim 1, wherein comparing the information to the window data determines that the date picker native to the mobile device is required by the remote resource; and
   wherein displaying the keyboard native to the mobile device on the mobile device is responsive to the determination that the date picker native to the mobile device is required by the remote resource.

6. The method of claim 1, further comprising:
   wherein the initialization packet further contains window lifetime information that may be used to identify the date picker native to the mobile device; and
   wherein comparing the information to the window data further includes comparing the window lifetime information contained in the initialization packet to the window data of the graphical user interface of the mobile device to determine that the date picker native to the mobile device should be activated.

7. A mobile computing device, comprising:
   one or more processors; and
   memory storing executable instructions that, when executed by the one or more processors, cause the mobile computing device to:
     present at least a portion of a window for a remote resource on a graphical user interface of the mobile computing device, wherein the remote resource is hosted by a remote computing device;
     transmit a click event to the remote computing device;
     receive, from the remote computing device, information associated with the window for the remote resource, wherein the information received from the remote computing device comprises an initialization packet that is responsive to the click event, and wherein the initialization packet contains Z-order information that may be used to identify a date picker native to the mobile computing device;
     in response to receipt of the information from the remote computing device, compare the Z-order information contained in the initialization packet to window data of a graphical user interface of the mobile computing device to determine that the date picker native to the mobile computing device should be activated, wherein the window data describes one or more properties of the window for the remote resource on the graphical user interface of the mobile computing device;
     display the date picker native to the mobile computing device;
     receive, from the remote computing device, a termination packet;
     process the termination packet to identify the date picker native to the mobile computing device; and
     cause the date picker native to the mobile computing device to be not displayed on the mobile computing device.

8. The mobile computing device of claim 7, wherein the information further comprises one or more of window size, window position, or window lifetime;
   wherein the window data comprises window data of a graphical user interface of the mobile computing device or window data for the remote resource that was received from the remote computing device; and wherein comparing the information to the window data comprises comparing the one or more of the window size, the window position, or the window lifetime, to the window data of the graphical user interface of the mobile computing device.

9. The mobile computing device of claim 7, wherein the executable instructions, when executed by the one or more processors, further cause the mobile computing device to:
automatically zoom or pan to the portion of the window; and
display a secondary window for the remote resource on the mobile device without automatically zooming or panning to the secondary window.

10. The mobile computing device of claim 7, wherein the executable instructions, when executed by the one or more processors, cause the mobile computing device to compare the information to the window data to determine that the date picker native to the mobile computing device should be activated at least in part by:
identifying a date picker control; and
determining that the date picker native to the mobile computing device should be activated at least in part responsive to identifying the date picker control.

11. The mobile computing device of claim 7, wherein the executable instructions, when executed by the one or more processors, further cause the mobile computing device to:
determine that the date picker native to the mobile device is required by the remote resource; and
display the keyboard native to the mobile device on the mobile device responsive to the determination that the date picker native to the mobile device is required by the remote resource.

12. The mobile computing device of claim 7, further comprising:
wherein the initialization packet further contains window lifetime information that may be used to identify the date picker native to the mobile device; and
wherein the executable instructions, when executed by the one or more processors, further cause the mobile computing device to compare the information to the window data at least in part by comparing the window lifetime information contained in the initialization packet to the window data of the graphical user interface of the mobile device to determine that the date picker native to the mobile device should be activated.

13. One or more non-transitory computer-readable media storing executable instructions that, when executed, cause a mobile computer device to:
present at least a portion of a window for a remote resource on a graphical user interface of the mobile computing device, wherein the remote resource is hosted by a remote computing device;
transmit a click event to the remote computing device;
receive, from the remote computing device, information associated with the window for the remote resource, wherein the information received from the remote computing device comprises an initialization packet that is responsive to the click event, and wherein the initialization packet contains Z-order information that may be used to identify a date picker native to the mobile computing device;
in response to receipt of the information from the remote computing device, compare the Z-order information contained in the initialization packet to window data of a graphical user interface of the mobile computing device to determine that the date picker native to the mobile computing device should be activated, wherein the window data describes one or more properties of the window for the remote resource on the graphical user interface of the mobile computing device;
display the date picker native to the mobile computing device;
receive, from the remote computing device, a termination packet;
process the termination packet to identify the date picker native to the mobile computing device; and
cause the date picker native to the mobile computing device to be not displayed on the mobile computing device.

* * * * *